No. 691,885. Patented Jan. 28, 1902.
D. H. ABNEY.
ADJUSTABLE COUPLING FOR SEWING MACHINE OR OTHER ROUND BELTS.
(Application filed Oct. 22, 1901.)
(No Model.)

Witnesses:
Arthur McArthur
H. C. Rodgers

Inventor:
Diton H. Abney
By Fischer Thorpe
attys.

UNITED STATES PATENT OFFICE.

DITON H. ABNEY, OF KANSAS CITY, MISSOURI.

ADJUSTABLE COUPLING FOR SEWING-MACHINE OR OTHER ROUND BELTS.

SPECIFICATION forming part of Letters Patent No. 691,885, dated January 28, 1902.

Application filed October 22, 1901. Serial No. 79,558. (No model.)

*To all whom it may concern:*

Be it known that I, DITON H. ABNEY, a citizen of the United States, residing at Kansas City, in the county of Jackson and State of Missouri, have invented certain new and useful Improvements in Adjustable Couplings for Sewing-Machine or other Round Belts, of which the following is a specification.

My invention relates to an adjustable coupling for sewing-machine and other round belts, and is designed particularly as an improvement over the similar device on which I filed application for patent May 9, 1901, Serial No. 59,365, and which was allowed July 17, 1901, my object in this connection being to produce a swivel connection whereby the device can be adjusted without uncoupling.

To this end the invention consists in its novel and peculiar construction and organization as hereinafter described, and pointed out in the appended claims, and in order that it may be fully understood reference is to be had to the accompanying drawings, in which—

Figure 1:
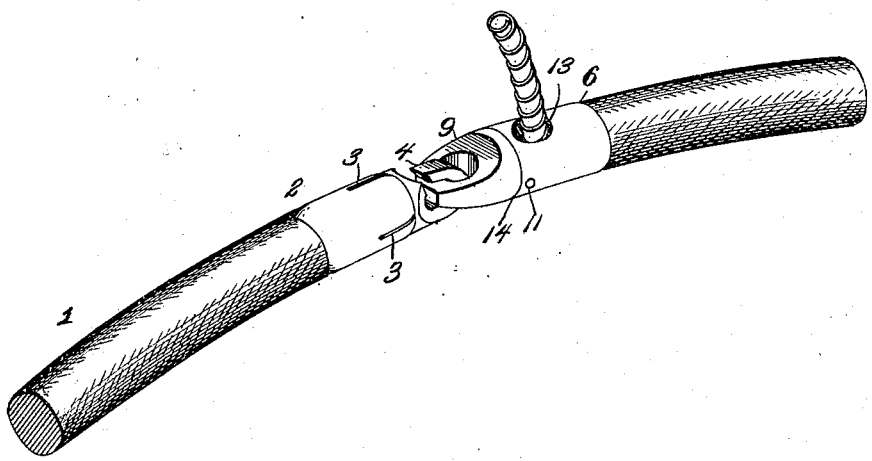
Figure 2:
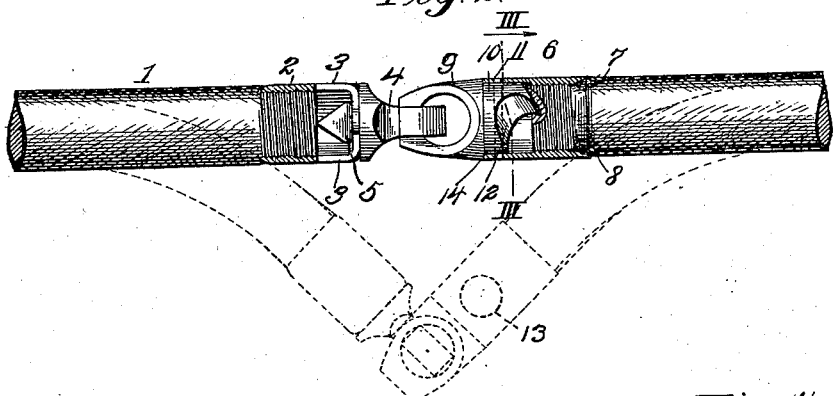
Figure 3:
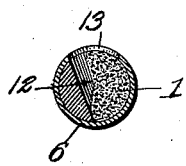
Figure 4:
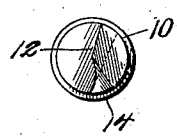

Figure 1 is a perspective view showing the ends of a round belt secured together by a coupling embodying my invention. Fig. 2 is a view showing the coupling-sleeves in section and the remaining parts in elevation. Fig. 3 is a cross-section taken on the line III III of Fig. 1. Fig. 4 is an end view of the rotary blade or auger.

In the said drawings, 1 designates an ordinary round belt, of leather or equivalent material, such as a sewing-machine belt, and 2 one of the sleeves of my improved coupling, the same being of cylindrical form preferably and reliably secured upon one end of the belt in any suitable manner, and at the end projecting beyond the end of the belt it is provided with diametrically opposite slits 3 to facilitate the crimping inward of such end, so that the hook 4 may be swiveled therein without danger of accidental dislocation, the head 5 of the hook bearing against the inwardly-turned end of the sleeve for this purpose. 6 designates the other sleeve of the coupling, mounted upon the opposite end of the belt and internally screw-threaded, as at 7, in order that when turned in the proper direction it shall advance upon and cut its mating thread in the belt in an obvious manner, it being understood that the front end of the sleeve is preferably flared or sharpened, as at 8, so as to facilitate this operation.

9 designates a loop adapted for engagement or disengagement with hook 4 only when turned at right angles thereto, as shown in Fig. 2, so as to obviate chance of accidental disengagement. Said loop is formed with a diametrically-reduced stem 10 to fit snugly in sleeve 6, a pin or rivet 11 extending diametrically through the sleeve and stem to hold the latter reliably in place. The stem terminates in a spiral cutting-blade or auger 12, the cutting edge of which extends from the inner wall to the center of the sleeve in order that it may cut or pare to the center of the belt, as hereinafter appears. By preference the bevel or disposition of the blade should correspond with that of the threads of the sleeve, so that it shall cut or pare from the end of the belt proportionate to the advance thereon of the sleeve.

The groove of the auger registers at its outlet end—viz., that from which the shaving escapes—with a hole 13 in the side of the sleeve, and in order to facilitate the proper disposition of the stem in the sleeve the loop is formed with a shoulder 14 to engage the front end of the sleeve, and thus enable the stem to be slipped in quickly without danger of going too far.

When the hook and loop are interlocked or connected, (and in this connection it should be understood that the loop may be swiveled and the hook formed with the blade or auger if desired,) it will be apparent that it is only necessary to engage the device with a suitable instrument, such as a pair of pliers or a rod, and turn it in the proper direction to cause the threaded sleeve to screw its way upon the belt and incidentally pare material from its end, the pared material emerging through the hole of the sleeve in the shape of a spiral shaving, as shown in Fig. 1. It is to be understood that the belt must be held from turning during this operation, the swivel connection of course permitting the threaded sleeve to turn without disturbing the sleeve on the opposite end of the belt. If desired, the ends of the belt may be uncoupled, and the threaded blade or auger carrying sleeve advanced, as described.

By the use of a coupling of the character described it is clear that an exceedingly-fine adjustment of the belt can be made. With the old form of connection for round belts considerable annoyance and trouble is experienced in attempting to tension them. The only practical way of doing this is to cut away a portion from the end of the belt and then resecure the ends together. In doing this if the amount cut away is too great the belt is ruined for that particular purpose, whereas if it is too little it has to be again cut, and sometimes it is necessary to repeat this operation several times before the proper tension is secured.

My improved coupling and tension device is designed for use in connection with round belts of all descriptions and for all purposes; but will be found especially appropriate on sewing-machine belts, which should be tensioned at frequent intervals, but which with the wire link now employed are extremely difficult to tension, particularly for a woman. It is obvious that the hook and loop are not indispensable, as a different type of connection for detachably uniting the sleeves may be employed without affecting the essential features of the coupling, the same comprising a threaded sleeve and a blade or auger carried thereby, so that as the sleeve advances the blade will shave material from the end of the belt, and the swivel connection whereby the blade or auger carrying sleeve is enabled to turn while coupled to the other.

Having thus described the invention, what I claim as new, and desire to secure by Letters Patent, is—

1. In a device of the character described, a screw member provided with a blade or auger to engage and pare off the end of the belt, a second member or sleeve secured upon the opposite end of the belt, and a swivel connection between said members so as to permit the screw member to turn independent of that engaged with the opposite end of the belt.

2. In a device of the character described, a pair of sleeves or members mounted on the ends of the belt and interlocked together; one member being provided with internal threads to enable it to screw upon the belt, and with a side hole, and with an internal spiral blade or auger having its groove registering at its discharge end with said hole, substantially as described.

3. In a device of the character described, an internally-threaded sleeve screwed upon the belt, and provided with a side hole, a second sleeve secured upon the opposite end of the belt, a hook and loop interlocked together, one being swiveled to the last-named sleeve, and the other secured in the first-named sleeve and provided at its inner end with a spiral blade or auger having the outer end of its groove registering with said hole, substantially as described.

In testimony whereof I affix my signature in the presence of two witnesses.

DITON H. ABNEY.

Witnesses:
H. C. RODGERS,
G. Y. THORPE.